(12) United States Patent
Bennett et al.

(10) Patent No.: US 8,488,932 B2
(45) Date of Patent: Jul. 16, 2013

(54) OPTICAL FIBER WITH INCREASED MECHANICAL STRENGTH

(75) Inventors: Kevin Wallace Bennett, Hammondsport, NY (US); Andrey V Filippov, Painted Post, NY (US); Peter Joseph Ronco, Horseheads, NY (US); Roger A Rose, Painted Post, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 279 days.

(21) Appl. No.: 13/034,126

(22) Filed: Feb. 24, 2011

(65) Prior Publication Data

US 2011/0211797 A1    Sep. 1, 2011

Related U.S. Application Data

(60) Provisional application No. 61/308,583, filed on Feb. 26, 2010.

(51) Int. Cl.
*G02B 6/02* (2006.01)
(52) U.S. Cl.
USPC ............ 385/128; 385/123; 385/126; 385/127

(58) Field of Classification Search
USPC ......................................................... 385/128
See application file for complete search history.

(56) References Cited

U.S. PATENT DOCUMENTS

| 4,102,664 A | * | 7/1978 | Dumbaugh, Jr. ................ 65/23 |
| 4,243,298 A | * | 1/1981 | Kao et al. ...................... 385/128 |
| 5,140,665 A | | 8/1992 | Backer et al. ................. 385/126 |
| 5,446,820 A | * | 8/1995 | Ishikawa et al. .............. 385/123 |
| 2011/0085768 A1 | | 4/2011 | Nakanishi et al. ............ 385/102 |

OTHER PUBLICATIONS

Oh et al ("Increased durability of optical fiber through the use of compressive cladding", Optics Letters, May 1982, vol. 7, No. 5; p. 241-243).*

"Increased durability of optical fiber through the use of compressive cladding"; Oh et al; Optics Letters; May 1982, vol. 7, No. 5; p. 241-243.

Dumbaugh, W.H., et al. "Strong Composite Glasses", Journal of Non-Crystalline Solids 38 & 39 (1980) pp. 469-474.

Wissuchek, D.J., et al. "Analysis of Residual Stress in Optical Fiber", Part of the SPIE Conference on Optical Fiber Reliability and Testing, Boston, Massachusetts, Sep. 1999, SPIE vol. 3848, pp. 34-43.

\* cited by examiner

*Primary Examiner* — Ryan Lepisto
(74) *Attorney, Agent, or Firm* — Matthew J. Mason

(57) ABSTRACT

An optical fiber having increased mechanical strength is provided. The optical fiber includes an over cladding layer that has a compressive stress of at least 100 MPa.

14 Claims, 2 Drawing Sheets

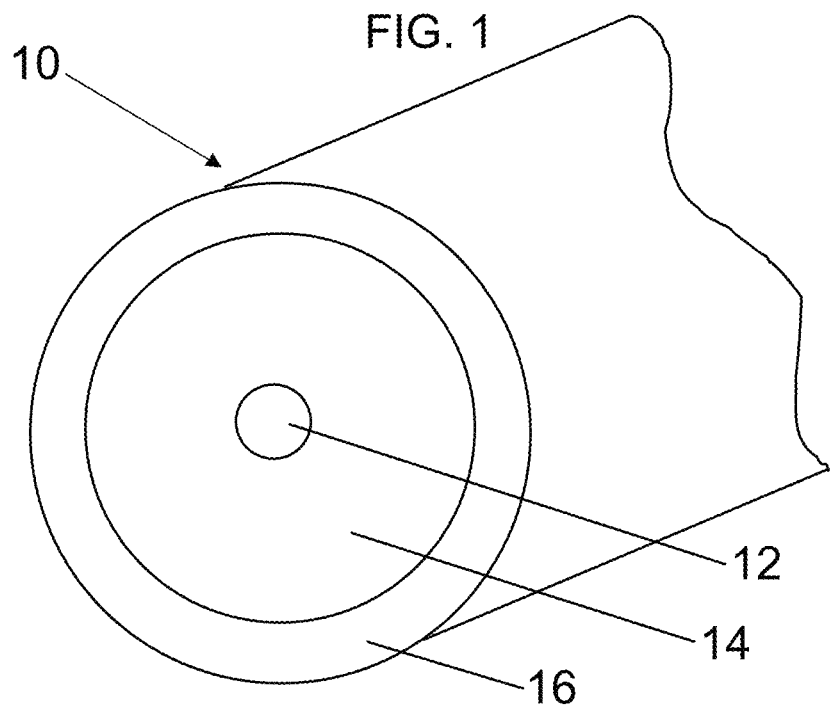
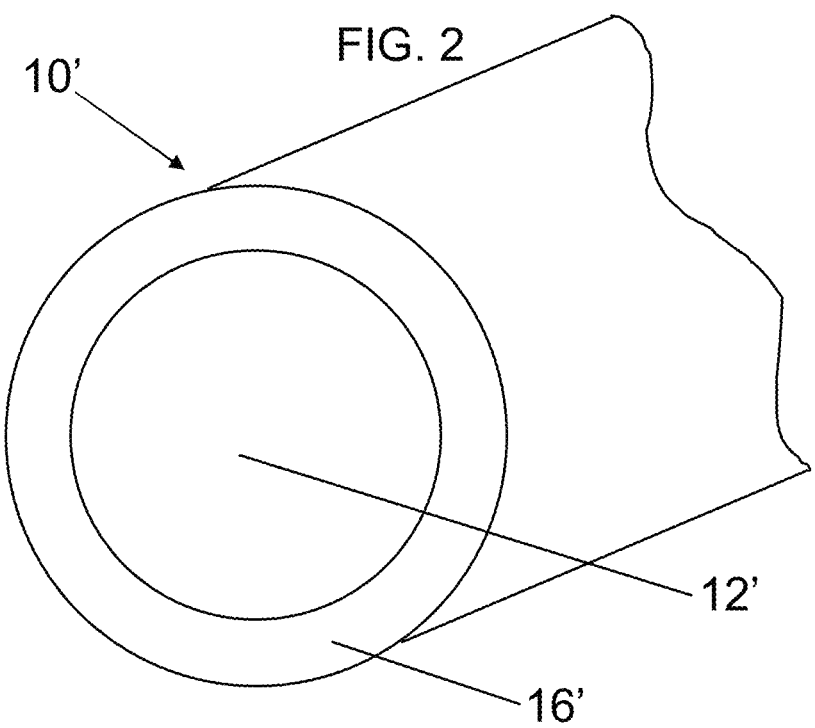

US 8,488,932 B2

OPTICAL FIBER WITH INCREASED MECHANICAL STRENGTH

CROSS-REFERENCE To RELATED APPLICATIONS

This application claims the benefit of, and priority to U.S. Provisional Patent Application No. 61/308,583 filed on Feb. 26, 2010 entitled, "Optical Fiber with Increased Mechanical Strength", the content of which is relied upon and incorporated herein by reference in its entirety.

BACKGROUND

The disclosure relates generally to optical fibers and more particularly to optical fibers having improved mechanical strength.

Mechanical properties of optical fibers are very important, as they influence the way the fibers are woven into cables and also influence the properties of the cables themselves. A particularly important mechanical property is mechanical strength.

The mechanical strength of a glass material, including the essentially pure or slightly doped silica typically used to make optical fiber, is at least in part a function of components or ingredients used to make the glass. In addition, the mechanical strength of a glass material can be influenced by processing conditions used to make the glass. For example, in planar glass products, the strength of the glass can be significantly increased if the outer surface of the glass is processed to be in a state of compressive stress.

SUMMARY

One embodiment of the disclosure relates to an optical fiber that includes a core, an inner cladding layer surrounding the core, and an over cladding layer surrounding the inner cladding layer. The over cladding layer has a compressive stress of at least 100 MPa.

An additional embodiment of the disclosure relates to an optical fiber that includes a core and an over cladding layer surrounding the core. The over cladding layer has a compressive stress of at least 100 MPa.

Another embodiment of the disclosure relates to a method of making an optical fiber. The method includes drawing an optical fiber from an optical fiber preform, wherein the optical fiber includes a core, an inner cladding layer surrounding the core, and an over cladding layer surrounding the inner cladding layer. The over cladding layer has a compressive stress of at least 100 MPa in the finished optical fiber.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 illustrates schematically an embodiment of an optical waveguide fiber;

FIG. 2 illustrates schematically another embodiment of an optical waveguide fiber.

DETAILED DESCRIPTION

Figure 3:
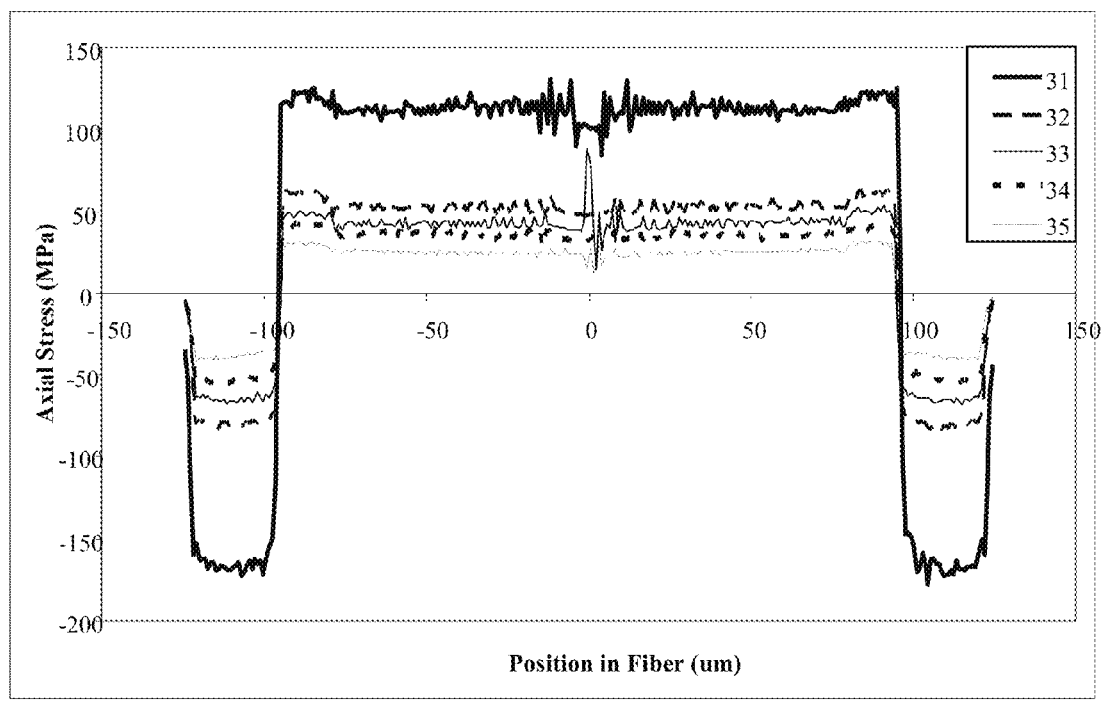
FIG. 3 plots stress as a function of radial position for optical fibers corresponding to the embodiment illustrated in FIG. 2.

Optical fibers having increased mechanical strength and methods of their manufacture are disclosed herein. The optical fibers include an over cladding layer that has a compressive stress of at least 100 MPa. By stating that the over cladding layer has a compressive stress of at least 100 MPa, we mean that the over cladding layer is in a state of compression, with the magnitude or absolute value of the compressive stress being at least 100 MPa. Compressive stress values can be determined using the fiber stress measurement technique reported in Wissuchek et al., "Analysis of Residual Stress in Optical Fiber", *Part of the SPIE Conference on Optical Fiber Reliability and Testing*, Boston, Mass., September 1999, SPIE Vol. 3848, pp. 34-43, the entire disclosure of which is incorporated herein by reference. The softening point of a glass layer or region is defined as the temperature at which the viscosity of the glass in the temperature or region is equal to about $10^{7.6}$ poise (i.e., $3.981 \times 10^7$ poise). The softening point of the glass and viscosity of the glass at temperatures near the softening point can be determined using ASTM C338-93 (2008) "Standard Test Method for Softening Point of Glass."

FIG. 1 schematically illustrates an exemplary embodiment of an optical fiber as disclosed herein. The optical fiber 10 includes a core region 12, an inner cladding layer 14 surrounding the core 12, and an over cladding layer 16 surrounding the inner cladding layer 14, wherein the over cladding layer 16 has a compressive stress of at least 100 MPa, such as at least 150 MPa, and further such as at least 200 MPa. The optical fiber can also be coated with one or more coating layers (not shown), such as coatings comprising a polymeric material.

FIG. 2 schematically illustrates another exemplary embodiment of an optical fiber as disclosed herein. The optical fiber 10' includes a core region 12' and an over cladding layer 16' surrounding the core 12', wherein the over cladding layer 16' has a compressive stress of at least 100 MPa, such as at least 150 MPa, and further such as at least 200 MPa. The optical fiber can also be coated with one or more coating layers (not shown), such as coatings comprising a polymeric material.

Optical fibers having an over cladding layer with a compressive stress of at least 100 MPa can be produced using methods disclosed herein, wherein the viscosity and radial thickness of the over cladding layer are controlled to be within specified ranges. In addition, the compressive stress in the over cladding layer can also be affected by the tension under which the fiber is drawn. Such fiber can have increased mechanical strength characteristics without a substantial negative impact of the fiber refractive index profile as the result of the stress-optic effect.

The stress-optic effect is an effect that occurs as a result of stresses in the fiber that alter the index of the fiber from the value that would be expected from composition alone. For example, as a result of stresses induced at draw, the atomic distance as well as the electron shells of atoms in the glass can be influenced. These cause a change in refractive index of the glass, which in cylindrical coordinates is given as:

$$\Delta n_r = n_r - n = -B_2\sigma_r - B_1(\sigma_\theta + \sigma_z)$$

$$\Delta n_\theta = n_r - n = -B_2\sigma_\theta - B_1(\sigma_r + \sigma_z)$$

$$\Delta n_z = n_r - n = -B_2\sigma_z - B_1(\sigma_\theta + \sigma_r)$$

where n is the refractive index of unstressed glass, $n_r$, $n_\theta$ and $n_z$ are the effective refractive index in the radial, azimuthal and axial direction respectively, and, $B_1$ and $B_2$ are the stress-optical coefficients. Correspondingly, the over clad layer material and over clad layer thickness, as well as the draw tension, are chosen such that the change in the index of the core as a result of the stress-optic effect is not large enough to impact the waveguide capabilities of the core.

By modifying the viscosity of the over cladding layer relative to the layer or region it immediately surrounds, different layers of the fibers support different loads when the fiber is drawn under tension, causing the over cladding layer to have compressive stress during cooling of the fiber as it is being drawn. The viscosity of the over cladding layer can, for example, be modified by doping the over cladding layer with one or more dopants. Such dopants may be added to the over cladding layer during a laydown stage, such as during an outside vapor deposition (OVD) process, or during a consolidation stage. Examples of dopants that can be preferably added during a laydown stage include germania, boron, phosphorous, titania, alumina, phosphorous, and alkali metals, such as sodium and potassium. Examples of dopants that can be preferably added during a consolidation stage include fluorine and chlorine.

The amount of dopant or dopants in the over cladding layer should preferably be sufficient to modify the viscosity of the over cladding layer within a predetermined range relative to the viscosity of the layer or region it immediately surrounds, wherein the viscosity of the over cladding layer is lower than the viscosity of the layer or region it immediately surrounds over at least a predetermined temperature range. Preferably the temperature range will be a temperature range through which the optical fiber passes while being drawn from an optical fiber preform, such as the softening point of the layer or region being surrounded by the over cladding layer±100° C., and further such as the softening point of the layer or region being surrounded by the over cladding layer±200° C., and even further such as the softening point of the layer or region being surrounded by the over cladding layer ±400° C. Examples of preferred temperature ranges include from about 1200° C. to about 2000° C., such as from about 1400° C. to about 1800° C. Preferably, the ratio of the viscosity of the over cladding layer to the viscosity of the layer or region it immediately surrounds at any temperature of the optical fiber in the predetermined temperature range is from about 0.1 to about 0.9, more preferably from about 0.1 to about 0.5, such as from about 0.1 to about 0.2 and further such as from about 0.2 to about 0.5.

For example, in the embodiment illustrated in FIG. 1, the ratio of the viscosity of the over cladding layer to the viscosity of the inner cladding layer at any temperature of the optical fiber in the range of the softening point of the inner cladding layer±200° C. is preferably from about 0.1 to about 0.9, more preferably from about 0.1 to about 0.5, such as from about 0.1 to about 0.2 and further such as from about 0.2 to about 0.5. In a particularly preferred embodiment, the ratio of the viscosity of the over cladding layer to the viscosity of the inner cladding layer at any temperature of the optical fiber in the range of from about 1400° C. to about 1800° C. is from about 0.1 to about 0.9, more preferably from about 0.1 to about 0.5, such as from about 0.1 to about 0.2 and further such as from about 0.2 to about 0.5.

For example, in the embodiment illustrated in FIG. 1, the difference in the softening point of the over cladding layer and the softening point of the inner cladding layer is preferably greater than 40° C., such as greater than 60° C., further such as greater than 80° C., still further such as greater than 100° C., and yet still further such as greater than 120° C. For example, in preferred embodiments, the difference in the softening point of the over cladding layer and the softening point of the inner cladding layer is between 40° C. and 150° C., such as between 60° C. and 150° C., and further such as between 80° C. and 150° C., and still further such as between 100° C. and 150° C., wherein the softening point of the over cladding layer is lower than the softening point of the inner cladding layer.

In the embodiment illustrated in FIG. 2, the ratio of the viscosity of the over cladding layer to the viscosity of the core at any temperature of the optical fiber in the range of the softening point of the core±200° C. is preferably from about 0.1 to about 0.9, more preferably from about 0.1 to about 0.5, such as from about 0.1 to about 0.2 and further such as from about 0.2 to about 0.5. In a particularly preferred embodiment, the ratio of the viscosity of the over cladding layer to the viscosity of the core at any temperature of the optical fiber in the range of from about 1400° C. to about 1800° C. is from about 0.1 to about 0.9, more preferably from about 0.1 to about 0.5, such as from about 0.1 to about 0.2 and further such as from about 0.2 to about 0.5.

In the embodiment illustrated in FIG. 2, the difference in the softening point of the over cladding layer and the softening point of the core is preferably greater than 40° C., such as greater than 60° C., further such as greater than 80° C., still further such as greater than 100° C., and yet still further such as greater than 120° C. For example, in preferred embodiments, the difference in the softening point of the over cladding layer and the softening point of the core is between 40° C. and 150° C., such as between 60° C. and 150° C., and further such as between 80° C. and 150° C., and still further such as between 100° C. and 150° C., wherein the softening point of the over cladding layer is lower than the softening point of the core.

In preferred embodiments, dopants can be added in amounts and ratios that not only modify the viscosity of the over cladding layer relative to the viscosity of the layer or region it immediately surrounds but also modify the refractive index of the over cladding layer relative to the layer or region it immediately surrounds. In one set of preferred embodiments, one or more dopants can be added to lower the refractive index of the over cladding layer relative to the layer or region it immediately surrounds. Examples of such dopants include boron and fluorine. In another set of preferred embodiments, one or more dopants can be added to raise the refractive index of the over cladding layer relative to the layer or region it immediately surrounds. An example of such a dopant is germania. In yet another set of preferred embodiments, one or more dopants can be added such that the refractive index of the over cladding layer is approximately the same as the refractive index of the layer or region it immediately surrounds. For example, if the layer or region immediately surrounded by the over cladding layer is pure or substantially pure silica, the over cladding layer can be codoped with germania (an index raising dopant) and fluorine (an index lowering dopant) in a ratio that allows for the over cladding layer to have approximately the same refractive index as pure or substantially pure silica.

In addition to the viscosity of the over cladding, the radial thickness of the over cladding can be controlled to be within a predetermined range. To examine the effects of viscosity and radial thickness a series of exemplary single mode fibers were modeled having varying over cladding radial thickness and over cladding/inner cladding viscosity ratios. Each of the modeled fibers had a 125 μm diameter with a core having a 4.4 μm radius, wherein the core was modeled to be doped with about 7 wt % germania (corresponding to a maximum refractive index relative to pure silica of about 0.35%) and surrounded by an inner cladding layer of substantially pure silica, which in turn was surrounded by a over cladding layer, wherein for different exemplary fibers, the viscosity and radial thickness of the over cladding layer were allowed to vary. For each of the examples reported in Table 1, the viscosity ratio of the over clad layer to the inner clad layer was determined at a temperature of about 1650° C., which is about the softening point of the inner cladding layer, at which temperature the viscosity of the inner clad layer in each of the examples is about $3.981 \times 10^7$ poise. The exemplary fibers are set forth in Table 1.

TABLE 1

| Example No. | Draw tension (g) | Viscosity ratio of over clad layer to inner clad layer | Radial thickness of over clad layer (μm) | Core effective index relative to pure silica (% Δ) | Inner clad layer effective index relative to pure silica (% Δ) | Over clad layer effective index relative to pure silica (% Δ) |
|---|---|---|---|---|---|---|
| 1  | 200 | 0.9 | 27.5 | 0.3542 | −0.0039 | 0.0019 |
| 2  | 200 | 0.9 | 37.5 | 0.3535 | −0.0050 | 0.0009 |
| 3  | 200 | 0.9 | 47.5 | 0.3531 | −0.0056 | 0.0003 |
| 4  | 200 | 0.5 | 27.5 | 0.3393 | −0.0425 | 0.0133 |
| 5  | 200 | 0.5 | 37.5 | 0.3323 | −0.0388 | 0.0075 |
| 6  | 200 | 0.5 | 47.5 | 0.3266 | −0.0479 | 0.0029 |
| 7  | 200 | 0.2 | 27.5 | 0.3175 | −0.0624 | 0.0306 |
| 8  | 200 | 0.2 | 37.5 | 0.2880 | −0.1094 | 0.0211 |
| 9  | 200 | 0.2 | 47.5 | 0.2535 | −0.1646 | 0.0101 |
| 10 | 200 | 0.1 | 27.5 | 0.3052 | −0.0820 | 0.0402 |
| 11 | 200 | 0.1 | 37.5 | 0.2533 | −0.1649 | 0.0319 |
| 12 | 200 | 0.1 | 47.5 | 0.1688 | −0.2997 | 0.0184 |

The lower viscosity in the over clad layer relative to the viscosity in the inner clad layer, as shown in Table 1, can, for example, be achieved by adding dopants in the over clad layer in the amounts set forth below in Table 1A.

TABLE 1A

| Viscosity ratio of over clad layer to inner clad layer | Dopant | Wt % Dopant |
|---|---|---|
| 0.9 | fluorine | 0.09 |
| 0.5 | fluorine | 0.61 |
| 0.2 | fluorine | 1.43 |
| 0.1 | fluorine | 2.04 |
| 0.9 | germania | 1.58 |
| 0.5 | germania | 10.38 |
| 0.2 | germania | 24.10 |
| 0.1 | germania | 34.48 |
| 0.9 | titania | 0.73 |
| 0.5 | titania | 4.78 |
| 0.2 | titania | 11.09 |
| 0.1 | titania | 15.87 |

In addition, the over cladding layer can be codoped with germania and fluorine in a ratio that allows for the over cladding layer to have approximately the same refractive index as pure or substantially pure silica as set forth, for example in Table 1B.

TABLE 1B

| Viscosity ratio of over clad layer to inner clad layer | Wt % germania | Wt % fluorine |
|---|---|---|
| 0.9 | 0.42 | 0.07 |
| 0.5 | 2.79 | 0.45 |
| 0.2 | 6.47 | 1.04 |
| 0.1 | 9.26 | 1.49 |

In preferred embodiments of the embodiment illustrated in FIG. 1, when fluorine is used as a dopant in the over clad layer, it can be present in the over clad layer, alone or in combination with one or more other dopants, in amounts ranging from 0.05 to 2.5 wt %, such as from 0.1 to 1.5 wt %, and further such as from 0.2 to 1.0 wt %. When germania is used as a dopant in the over clad layer, it can be present in the over clad layer, alone or in combination with one or more other dopants, in amounts ranging from 0.25 to 35 wt %, such as from 0.5 to 25 wt %, and further such as from 1 to 10 wt %. When titania is used as a dopant in the over clad layer, it can be present in the over clad layer, alone or in combination with one or more other dopants, in amounts ranging from 0.25 to 20 wt %, such as from 0.5 to 10 wt %, and further such as from 1 to 5 wt %. When germania and fluorine are combined as codopants in the over clad layer, they can, for example, be present in amounts ranging from 0.3 to 10 wt % germania in combination with from 0.05 to 1.5 wt % fluorine, such as from 0.6 to 6 wt % germania in combination with from 0.1 to 1 wt % fluorine, and further such as from 1 to 3 wt % germania in combination with from 0.15 to 0.5 wt % fluorine.

As can be seen from Table 1, the effective index of the core appears to be affected by the radial thickness of the over clad layer, particularly at lower viscosity ratios of over clad layer to inner clad layer. Such effects are believed to be the result of the stress-optic effect described above.

Accordingly, the radial thickness of the over cladding layer is preferably large enough to have a sufficiently high compressive stress without the stress in the core region being so large as to substantially affect the effective index of the core of the fiber. Preferably, the radial thickness of the over cladding layer is from about 3% to about 30% of the radial thickness of the optical fiber, and even more preferably from about 5% to about 20% of the radial thickness of the optical fiber. For example, when the optical fiber has a diameter of 125 μm, the over cladding layer may have, for example, a radial thickness of between about 2.5 and about 17.5 μm, such as between about 7.5 and 12.5 μm. When the optical fiber has a diameter of 250 μm, the over cladding layer may have, for example, a radial thickness of between about 5 and about 35 μm, such as between about 15 and 25 μm.

The amount of the over clad layer compressive stress is also influenced by the tension under which the optical fiber is drawn. Preferably, the optical fiber is drawn at a draw tension of between about 100 g and 400 g, such as a draw tension of between about 200 g and 300 g.

Table 2 lists further examples of modeled single mode optical fiber having a 125 μm diameter with a core having a 4.4 μm radius, with a core doped with about 7 wt % germania. The core was surrounded by an inner cladding layer of substantially pure silica, which in turn was surrounded by a over cladding layer, wherein for different exemplary fibers, the viscosity and radial thickness of the over cladding layer were allowed to vary as was the tension under which the fiber was drawn. For each of the examples reported in Table 2, the viscosity ratio of the over clad layer to the inner cladding layer was determined at a temperature of about 1650° C., which is about the softening point of the inner clad layer, at which temperature the viscosity of the inner clad layer in each of the examples is about $3.981 \times 10^7$ poise. The difference between the softening point of the inner clad layer and over clad layer as reported in Table 2 can alternatively be understood as the amount (in ° C.) that the softening point of the over clad layer is less than about 1650° C.

TABLE 2

| Example No. | Draw tension (g) | Viscosity ratio of over clad layer to inner clad layer | Difference between softening point of inner clad and over clad (° C.) | Radial thickness of over clad layer (μm) | Core effective index relative to pure silica (% Δ) | Inner clad layer effective index relative to pure silica (% Δ) | Over clad layer effective index relative to pure silica (% Δ) | Compressive stress in over clad layer (MPa) |
|---|---|---|---|---|---|---|---|---|
| 13 | 200 | 0.2 | 95 | 17.5 | 0.3359 | −0.0331 | 0.0360 | 108 |
| 14 | 200 | 0.2 | 95 | 12.5 | 0.3433 | −0.0211 | 0.0380 | 115 |
| 15 | 200 | 0.2 | 95 | 7.5 | 0.3490 | −0.0113 | 0.0407 | 120 |
| 16 | 200 | 0.2 | 95 | 2.5 | 0.3546 | −0.0032 | 0.0420 | 126 |
| 17 | 200 | 0.1 | 133 | 17.5 | 0.3314 | −0.0403 | 0.0444 | 130 |
| 18 | 200 | 0.1 | 133 | 12.5 | 0.3409 | −0.0250 | 0.0450 | 130 |
| 19 | 200 | 0.1 | 133 | 7.5 | 0.3484 | −0.0130 | 0.0470 | 140 |
| 20 | 200 | 0.1 | 133 | 2.5 | 0.3543 | −0.0035 | 0.0480 | 140 |
| 21 | 300 | 0.5 | 42 | 7.5 | 0.3597 | −0.0099 | 0.0350 | 105 |
| 22 | 300 | 0.5 | 42 | 2.5 | 0.3640 | −0.0030 | 0.0388 | 115 |
| 23 | 300 | 0.2 | 95 | 17.5 | 0.3348 | −0.0496 | 0.0545 | 160 |
| 24 | 300 | 0.2 | 95 | 12.5 | 0.3459 | −0.0318 | 0.0581 | 173 |
| 25 | 300 | 0.2 | 95 | 7.5 | 0.3552 | −0.0170 | 0.0610 | 181 |
| 26 | 300 | 0.2 | 95 | 2.5 | 0.3629 | −0.0048 | 0.0635 | 180 |
| 27 | 300 | 0.1 | 133 | 17.5 | 0.3280 | −0.0604 | 0.0665 | 190 |
| 28 | 300 | 0.1 | 133 | 12.5 | 0.3423 | −0.0370 | 0.0687 | 204 |
| 29 | 300 | 0.1 | 133 | 7.5 | 0.3535 | 0.0197 | 0.0705 | 210 |
| 30 | 300 | 0.1 | 133 | 2.5 | 0.3625 | −0.0054 | 0.0720 | 214 |

Table 3 lists examples of multimode optical fiber that were processed having 250 μm diameter with a core having a diameter of about 190 μm. The core, which was comprised of substantially pure silica, was surrounded by an over cladding layer, which was co-doped with boron and fluorine.

TABLE 3

| Example No. | Fiber outer diameter (μm) | Core diameter (μm) | Draw speed (m/s) | Draw temperature (° C.) | Draw tension (g) | Boron in over cladding (wt %) | Fluorine in over cladding (wt %) |
|---|---|---|---|---|---|---|---|
| 31 | 250 | 190 | 3.5 | 1875 | >300 | 3.28 | 1.36 |
| 32 | 250 | 190 | 2.75 | 1900 | <200 | 3.28 | 1.36 |
| 33 | 250 | 190 | 2.75 | 1915 | <200 | 3.28 | 1.36 |
| 34 | 250 | 190 | 2.75 | 1930 | <200 | 3.28 | 1.36 |
| 35 | 250 | 190 | 2 | 1930 | <100 | 3.28 | 1.36 |

Stress as a function of radial position for the optical fibers of Table 3 is illustrated in FIG. 3 (wherein a negative value is indicative of a compressive stress or, in other words, the magnitude of the compressive stress is the absolute value of the negative values shown in FIG. 3). As can be seen from FIG. 3, the over cladding layer, which has a radial thickness of about 30 μm, has a compressive stress of greater than 150 MPa when, as in Example 31, the draw tension is greater than 300 g. In contrast, as shown in FIG. 3 for Examples 32-35 (which are comparative in nature), when the draw tension is lower, the compressive stress is less than 100 MPa.

In preferred embodiments, the over cladding layer of optical fibers corresponding to the embodiments set forth in Table 3 can be doped with between about 12 wt % and 1 wt % boron and 2.5 wt % and 1 wt % fluorine, such as between about 5 wt % and 1 wt % boron and 2 wt % and 1 wt % fluorine, and further such as between about 3 wt % and 1 wt % boron and 1.5 wt % and 1 wt % fluorine.

By having an over cladding layer that has a compressive stress of at least 100 MPa, optical fibers disclosed herein can have improved mechanical properties, particularly improved mechanical strength. For example, such optical fiber can be expected to have high tensile strength. By comparison, conventional optical fiber that does not have such an over cladding layer will have an outside compressive stress that is much lower, such as less than 25 MPa, and will have a substantially lower tensile strength.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising a core, an inner cladding layer surrounding the core, and an over cladding layer surrounding the inner cladding layer, wherein the over cladding layer has a compressive stress of at least 100 MPa;

and wherein the ratio of the viscosity of the over cladding layer to the viscosity of the inner cladding layer at any temperature of the optical fiber in the range of the softening point of the inner cladding layer ±200° C. is from about 0.1 to about 0.9.

2. The optical fiber of claim 1, wherein the difference in the softening point of the over cladding layer and the softening point of the inner cladding layer is greater than 40° C.

3. The optical fiber of claim 1, wherein the radial thickness of the over cladding layer is from about 3% to about 30% of the radial thickness of the optical fiber.

4. The optical fiber of claim 1, wherein the over cladding layer comprises at least one dopant selected from the group consisting of germania, fluorine, chlorine, boron, titania, phosphorous, alumina, potassium, and sodium.

5. The optical fiber of claim 1, wherein the over cladding layer has a compressive stress of at least 150 MPa.

6. The optical fiber of claim 1, wherein the radial thickness of the over cladding layer is between about 2.5 and about 17.5 µm.

7. The optical fiber of claim 1, wherein the ratio of the viscosity of the over cladding layer to the viscosity of the inner cladding layer at any temperature of the optical fiber in the range of the softening point of the inner cladding layer ±200° C. is from about 0.2 to about 0.5.

8. The optical fiber of claim 1, wherein the radial thickness of the over cladding layer is from about 5% to about 20% of the radial thickness of the optical fiber.

9. The optical fiber of claim 1, wherein the over cladding layer has a compressive stress of at least 200 MPa.

10. The optical fiber of claim 1, wherein the ratio of the viscosity of the over cladding layer to the viscosity of the inner cladding layer at any temperature of the optical fiber in the range of from about 1400° C. to about 1800° C. is from about 0.1 to about 0.9.

11. An optical fiber comprising a core and an over cladding layer surrounding the core, wherein the over cladding layer has a compressive stress of at least 100 MP;
and wherein the ratio of the viscosity of the over cladding layer to the viscosity of the core at any temperature of the optical fiber in the range of the softening point of the core ±200° C. is from about 0.1 to about 0.9.

12. The optical fiber of claim 11, wherein the difference in the softening point of the over cladding layer and the softening point of the core is preferably greater than 40° C.

13. The optical fiber of claim 11, wherein the radial thickness of the over cladding layer is from about 3% to about 30% of the radial thickness of the optical fiber.

14. The optical fiber of claim 11, wherein the radial thickness of the over cladding layer is between about 5 and about 35 µm.

* * * * *